US012662327B2

(12) United States Patent
Dwornick et al.

(10) Patent No.: US 12,662,327 B2
(45) Date of Patent: Jun. 23, 2026

(54) SHAFT-MOUNTED CONVEYOR ASSEMBLY

(71) Applicant: Laitram, L.L.C., Harahan, LA (US)

(72) Inventors: Martin A. Dwornick, Grand Rapids, MI (US); Jake A. Mohan, Grand Rapids, MI (US)

(73) Assignee: Laitram, L.L.C., Harahan, LA (US)

( * ) Notice: Subject to any disclaimer, the term of this patent is extended or adjusted under 35 U.S.C. 154(b) by 115 days.

(21) Appl. No.: 18/712,485

(22) PCT Filed: Dec. 1, 2022

(86) PCT No.: PCT/US2022/051483
§ 371 (c)(1),
(2) Date: May 22, 2024

(87) PCT Pub. No.: WO2023/102094
PCT Pub. Date: Jun. 8, 2023

(65) Prior Publication Data
US 2025/0002262 A1     Jan. 2, 2025

Related U.S. Application Data

(60) Provisional application No. 63/285,517, filed on Dec. 3, 2021.

(51) Int. Cl.
B65G 45/20     (2006.01)
B65G 33/26     (2006.01)

(52) U.S. Cl.
CPC .............. B65G 45/20 (2013.01); B65G 33/26 (2013.01)

(58) Field of Classification Search
CPC .... B65G 45/20; B65G 2207/30; B65G 33/26; F16D 1/0876; F16D 1/112; F16D 2300/12
See application file for complete search history.

(56) References Cited

U.S. PATENT DOCUMENTS

| | | | | |
|---|---|---|---|---|
| 296,477 A | * | 4/1884 | Smith | B65G 33/00 |
| | | | | 198/665 |
| 2,014,636 A | * | 9/1935 | Rosendahl | B65G 33/30 |
| | | | | 198/677 |
| 3,436,106 A | | 4/1969 | Luenberger | |
| 3,888,345 A | | 6/1975 | Laymon | |
| 4,399,906 A | * | 8/1983 | Millsap | B65G 33/265 |
| | | | | 198/677 |
| 4,691,818 A | * | 9/1987 | Weber | B65G 33/32 |
| | | | | 198/677 |

(Continued)

FOREIGN PATENT DOCUMENTS

| | | |
|---|---|---|
| CN | 214146323 U | 9/2021 |
| DE | 9015999 U1 | 3/1991 |

(Continued)

*Primary Examiner* — Mark A Deuble
(74) *Attorney, Agent, or Firm* — Catherine M. Bishop

(57) ABSTRACT

A shaft-mounted conveyor assembly (10) comprises a series of scroll modules (100, 102) arranged in series on a shaft (12) to form a helix having a peripheral surface for contacting a conveyor belt. Each scroll module includes an open hub (120) for receiving the shaft and a webbed scroll portion (110) defining the peripheral surface. The shaft includes L-shaped mounting slots (30) in mounting regions for mounting the scroll modules. A snap-on locking collar (200) prevents axial movement of the scroll modules after installation on the shaft.

18 Claims, 11 Drawing Sheets

(56)          References Cited

U.S. PATENT DOCUMENTS

| | | | | |
|---|---|---|---|---|
| 4,838,700 A * | 6/1989 | Williamson | ............ | B30B 9/121 |
| | | | | 198/677 |
| 5,088,397 A * | 2/1992 | Mansfield | ............... | B30B 9/121 |
| | | | | 198/677 |
| 5,687,832 A * | 11/1997 | Thiessen | ................ | B65G 33/24 |
| | | | | 198/677 |
| 6,390,283 B1 * | 5/2002 | Goodwin | ............ | B65G 33/265 |
| | | | | 198/664 |
| 7,516,838 B2 * | 4/2009 | Dutschke | ................ | A01F 12/46 |
| | | | | 198/677 |
| 11,613,855 B1 * | 3/2023 | Johnson | ................ | E01C 23/088 |
| | | | | 299/18 |
| 2018/0057269 A1 * | 3/2018 | Ross | .................... | B65G 39/073 |
| 2022/0274787 A1 | 9/2022 | DeGroot et al. | | |

FOREIGN PATENT DOCUMENTS

| | | | |
|---|---|---|---|
| KR | 102105183 | B1 | 5/2020 |
| SU | 395317 | A1 | 8/1973 |

* cited by examiner

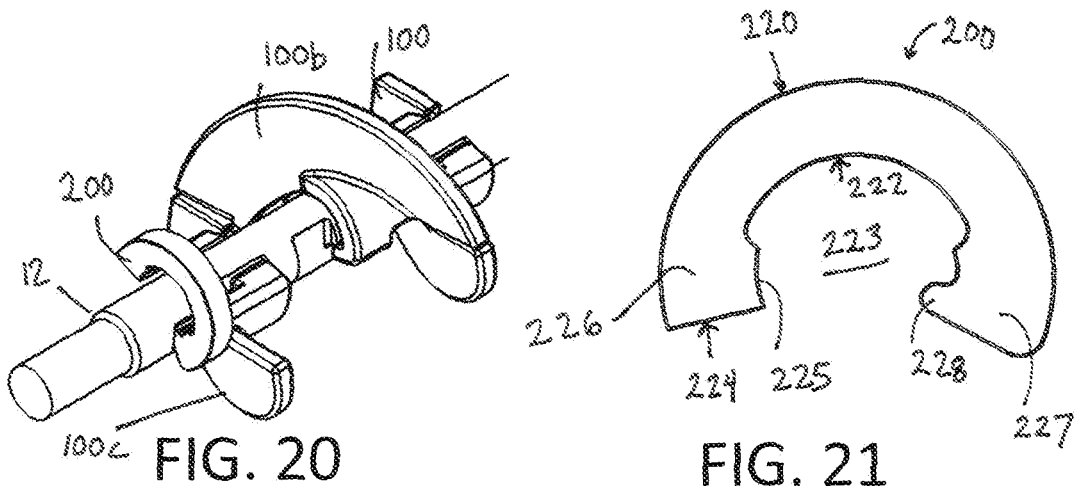
FIG. 20
FIG. 21
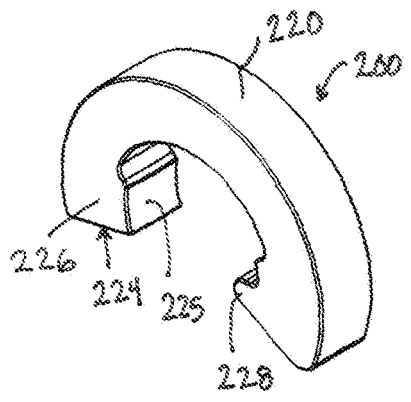
FIG. 22
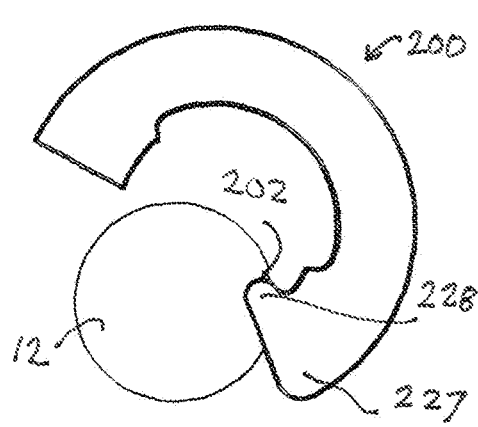
FIG. 23A
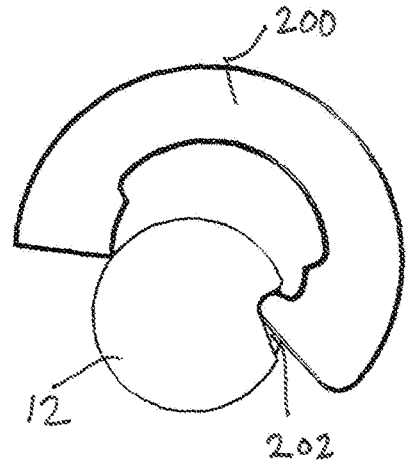
FIG. 23B
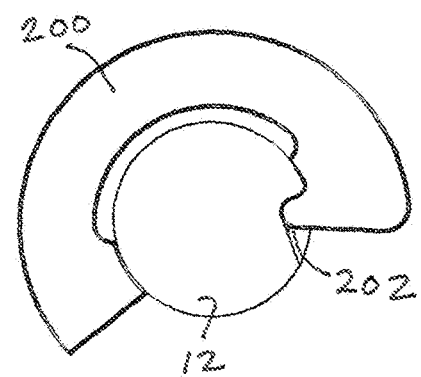
FIG. 23C

SHAFT-MOUNTED CONVEYOR ASSEMBLY

RELATED APPLICATIONS

The present application claims priority to U.S. Provisional Patent Application No. 63/285,517, filed Dec. 3, 2021 and entitled "SHAFT-MOUNTED CONVEYOR ASSEMBLY", the contents of which are herein incorporated by reference.

BACKGROUND

The invention relates generally to conveyor components that can be assembled on a shaft in an endless conveyor belt system.

Scrolls are idle devices mounted on or integral with a shaft in a conveyor that contact the inside of a conveyor belt to move debris away from the center of the conveyor belt, toward the edges, where the debris can fall harmlessly to the floor or into a receptacle. Current scroll design present difficulties with hygiene, assembly, disassembly and-or replacement of the scrolls in a conveyor system.

SUMMARY

A shaft-mounted conveyor assembly comprises a series of scroll modules arranged in series on a shaft. The shaft includes L-shaped mounting slots for mounting the scroll modules. A snap-on locking collar prevents axial movement of the scroll modules after installation on the shaft.

According to one aspect, a scroll module for a conveyor comprises a clamp portion having an open hub forming a shaft-receiving opening for seating a shaft of the conveyor and a webbed scroll portion extending from the clamp portion having a body that arcs and twists from a first edge to a second edge to form a half-coil of a helix.

According to another aspect, an assembly for a conveyor comprises a shaft having a plurality of L-shaped mounting slots formed in a series of mounting regions, a series of scroll modules mounted to the shaft using the L-shaped mounting slots to form a helical pulley and a locking collar for limiting axial movement of the series of scroll modules along the shaft.

According to another aspect, a method of assembling a scroll assembly on a shaft in a conveyor is provided. The shaft comprises a plurality of mounting regions, each mounting region including an L-shaped mounting slot on each side of the shaft. The assembly method comprises the steps of installing a first scroll module on the shaft in a first mounting region by sliding fingers in a hub portion of the first scroll module over peripheral flats in a first pair of L-shaped mounting slots and then moving the first scroll module in an axial direction to seat ledges in the first pair of L-shaped mounting slots in bends in the hub portion and installing a second scroll module on the shaft. The second scroll module is installed by sliding fingers in a hub portion of the second scroll module over peripheral flats in a second pair of L-shaped mounting slots, and then moving the second scroll module in the axial direction to seat ledges in the second pair of L-shaped mounting slots in bends in the hub portion. The first scroll module and second scroll module together form a complete turn of a helix.

BRIEF DESCRIPTION OF THE DRAWINGS

FIG. 20 shows the installation of a locking collar to the helical pulley assembly of FIG. 19;

FIG. 21 is a front view of the locking collar of the helical pulley assembly of FIG. 1;

FIG. 22 is an isometric view of the locking collar of the helical pulley assembly of FIG. 1;

FIGS. 23A-23C show the steps involved in snapping the locking collar of FIGS. 21 and 22 onto a shaft;

DETAILED DESCRIPTION

A shaft-mounted conveyor assembly for driving, cleaning, guiding or otherwise engaging a conveyor belt comprises multiple modules that mount on a rotatable shaft. The invention will be described below relative to certain illustrative embodiments, though the invention is not limited to the illustrative embodiments.

Figure 1:
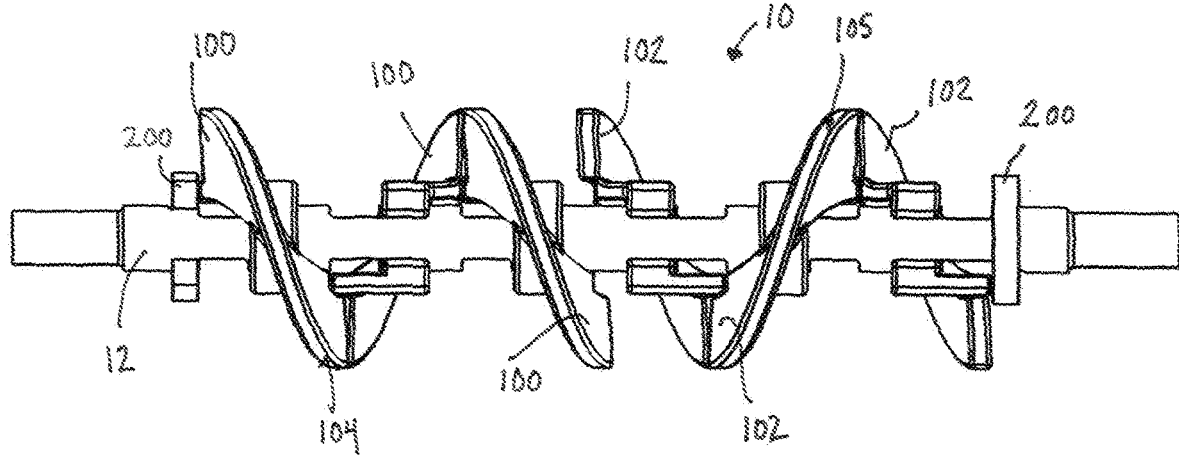
FIG. 1 is an end view of a shaft-mounted conveyor assembly comprising a plurality of scroll modules arranged in series on a shaft to form a helical pulley assembly.
Figure 2:
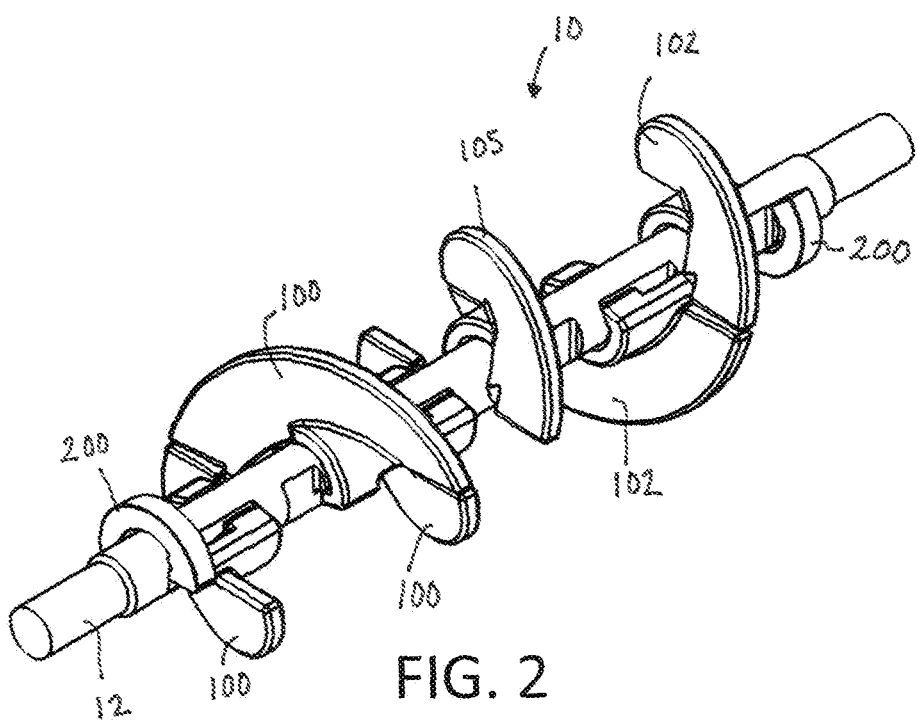
FIG. 2 is an isometric view of the helical pulley assembly of FIG. 1.
Figure 3:
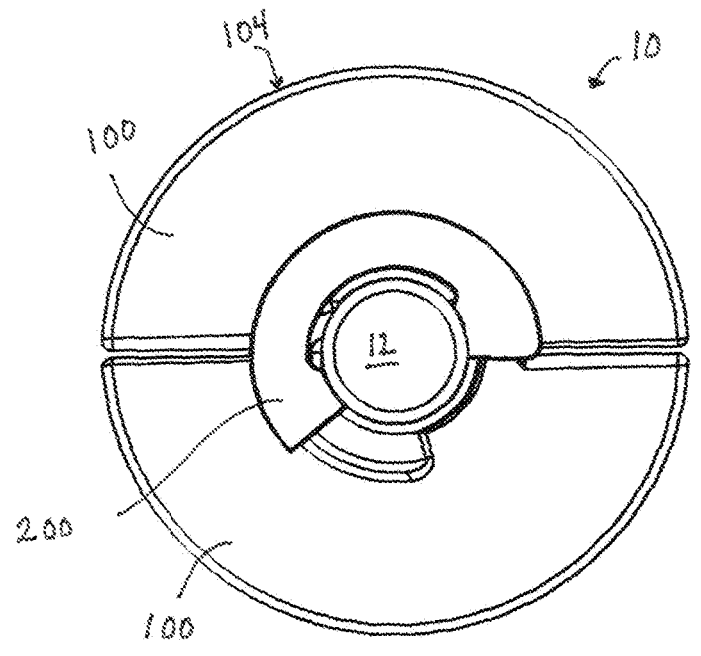
FIG. 3 is a side view of the helical pulley assembly of FIG. 1.

One version of a shaft-mounted assembly embodying features of the invention is shown in FIGS. 1-3. The illustrative shaft-mounted conveyor assembly 10 is a helical pulley formed by a series of scroll modules 100, 102 and locking collars 200 mounted on a shaft 12 to form a helical structure. The modules 100, 102 and locking collars 200 may be mounted to the shaft 12 without requiring tools, and may be easily removed from the shaft 12 without tools. Each a scroll module 100 or 102 forms half-turn of a helix, but can alternatively span another range. The illustrative assembly includes a plurality of first ("left-handed") scroll modules 100 having a first orientation and arranged in series, with the ends of each half-turn adjacent to each other to form the helical structure, and a plurality of second ("right-handed") scroll modules 102 arranged in series and having a second orientation, with the ends of each half-turn adjacent to each other to form the helical structure. The outer surface 104, 105 of the helix forms a peripheral surface for contacting a conveyor belt to move debris away from the conveyor belt. Product is driven outward from the center of the scroll assembly 10 by the scroll modules 100, 102. The illustrative assembly 10 forms a bidirectional in-feed scroll, but the invention is not so limited.

Figures 4, 5, 6, 7, 8, 9:
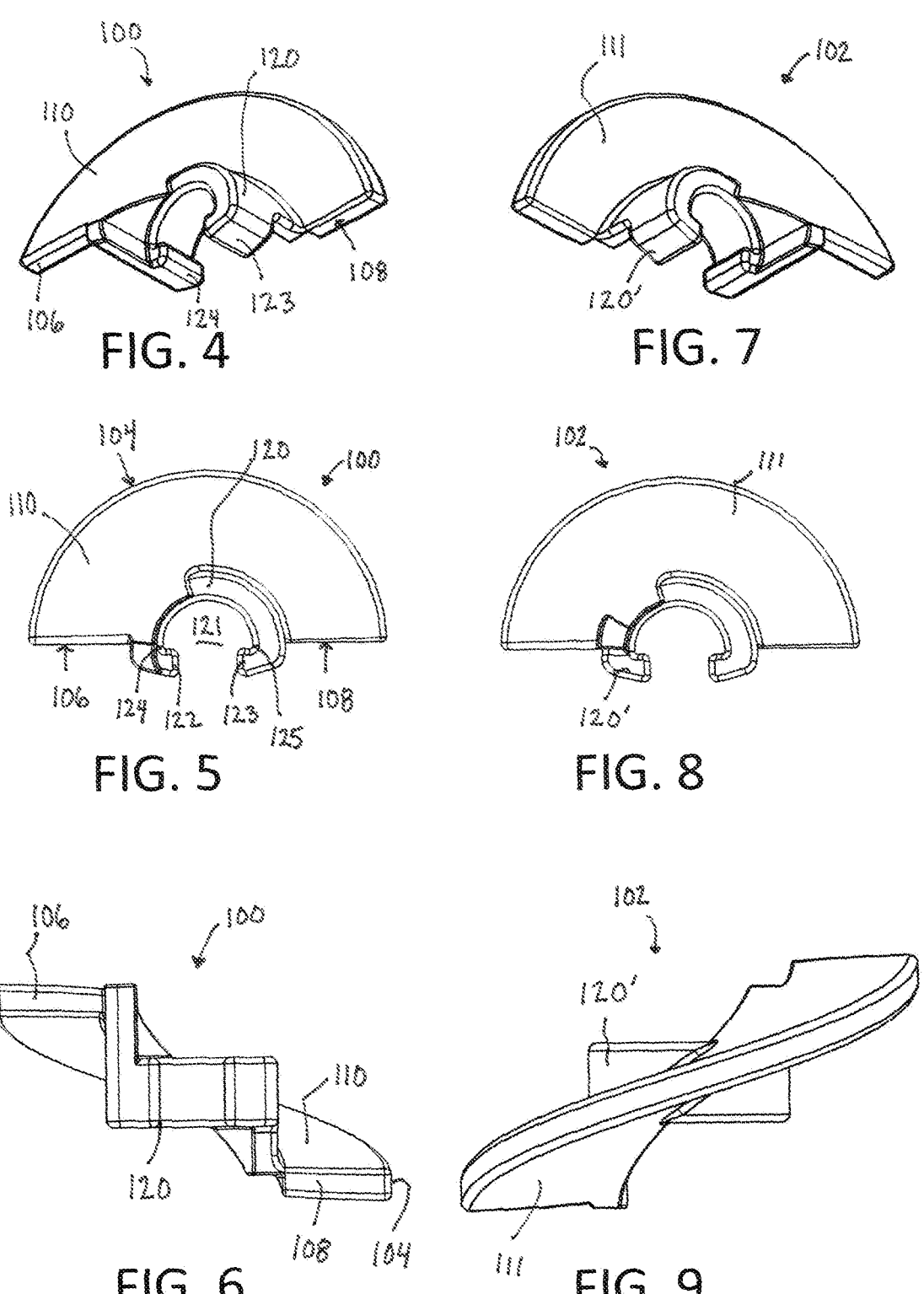
FIG. 4 is an isometric view of a first scroll module of the helical pulley assembly of FIG. 1.
FIG. 5 is a front view of the first scroll module of FIG. 4.
FIG. 6 is a bottom view of the first scroll module of FIG. 4.
FIG. 7 is an isometric view of a second scroll module of the helical pulley assembly of FIG. 1.
FIG. 8 is a front view of the second scroll module of FIG. 7.
FIG. 9 is a bottom view of the second scroll module of FIG. 7.

FIGS. 4-6 show an embodiment of a first scroll module 100 suitable for forming a portion of a scroll assembly, such as the assembly 10 of FIGS. 1-3. The first scroll module 100 is a "left-handed" scroll module and comprises a webbed scroll portion 110 forming a half-coil of the helix and a clamp portion 120 for mounting the module 100 to a shaft 12. The webbed scroll portion comprises a twisting body that arcs and twists from a first edge 106 to a second edge 108 to form the half-coil. The illustrative edges 106, 108 are straight and extend radially from the clamp portion 120 perpendicular to the axis of the shaft 12, but the invention is not so limited. The webbed scroll portion has a consistent thickness, terminating in the peripheral surface 104. The twisting body can form any portion of a helix and is not limited to a half-coil.

The clamp portion 120 comprises an open hub having a radially inner surface forming a shaft-receiving opening 121. Opposing fingers 122, 123 at the end of the hub narrow the entrance to the opening 121 and terminate in flat ends. The clamp portion forms bends 124, 125 at the intersections between the hub and the fingers 122, 123.

FIGS. 7-9 show an embodiment of a second scroll module 102 (shown as a "right-handed" scroll module) according to another embodiment. The second scroll module also includes a webbed scroll portion 111 that extends in a reverse direction to the webbed scroll portion 110 of the first scroll module 100. The second scroll module 102 also includes a clamp portion 120' similar or identical to the clamp portion 120 of the first scroll module 100.

Figures 10, 11, 12, 13:
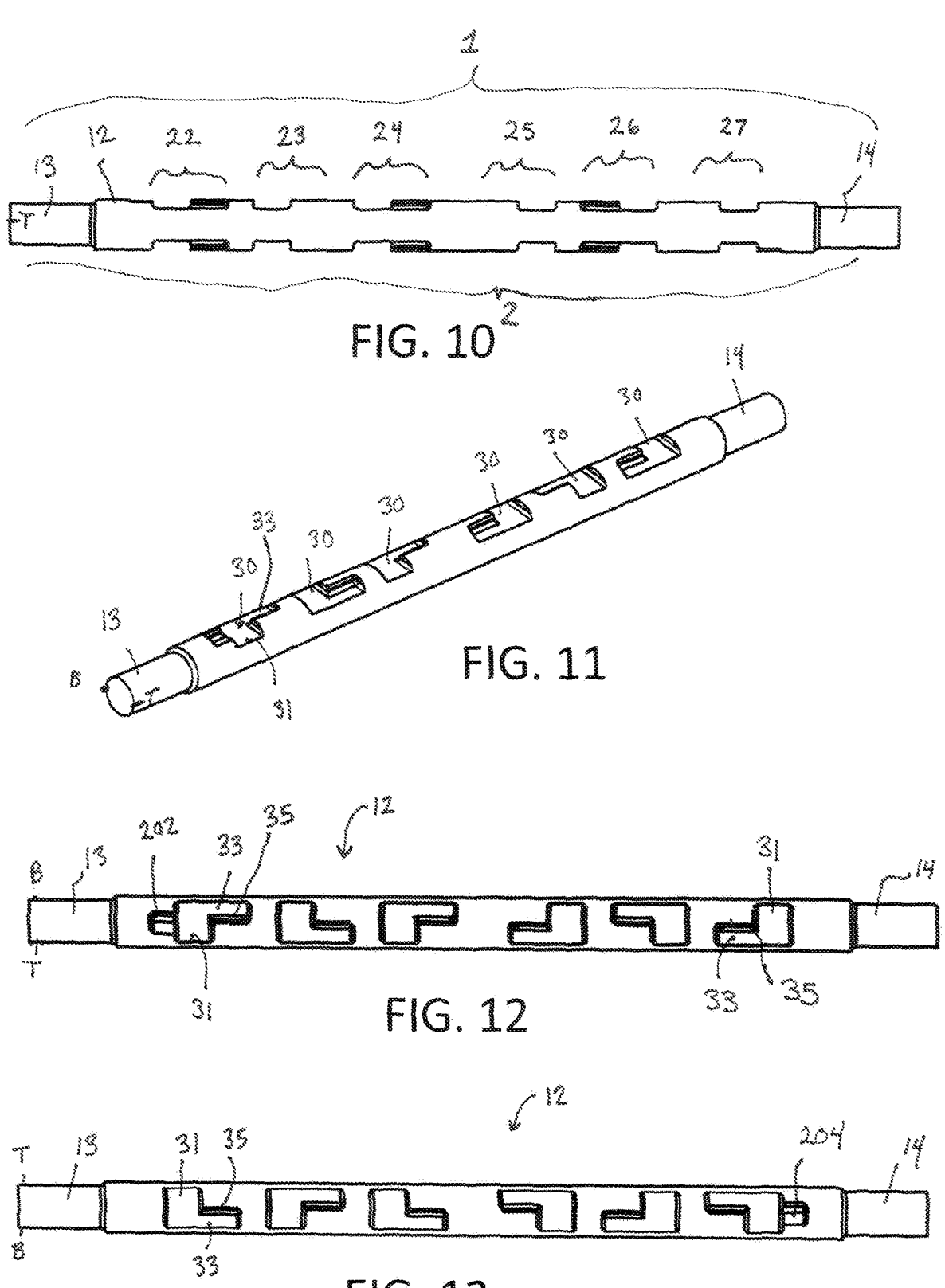
FIG. 10 is a top view of a shaft of the helical pulley assembly of FIG. 1.
FIG. 11 is an isometric view of the shaft of FIG. 10 showing a first side.
FIG. 12 is a side view of the first side of the shaft of FIG. 10.
FIG. 13 shows a second side of the shaft of FIG. 10.

The illustrative conveyor shaft 12 is shaped to facilitate mounting of the scroll modules, but the invention is not so limited. Referring to FIGS. 10-13, an illustrative shaft 12 comprises a main body, which is show as substantially round, extending from a first end 13 to a second end 14 along a longitudinal axis. FIG. 10 is a top view of the shaft 12. FIGS. 11 and 12 show a first side 1 of the shaft 12 and FIG. 13 shows a second side 2 of the shaft 12, though one skilled in the art will recognize that the top T and bottom B of the shaft are relative to each other, since the shaft 12 rotates about the longitudinal axis. The first end 13 and second end 14 may be journaled to facilitate rotation of the shaft 12. The main body of the shaft 12 forms a series of mounting regions 22, 23, 24, 25, 26 and 27 for mounting scroll modules 100, 102. Each mounting region 22, 23, 24, 25, 26 and 27 includes an L-shaped mounting slot 30 on each side 1, 2 of the shaft 12. The L-shaped mounting slots 30 alternate in orientation, with each pair of L-shaped mounting slots in each mounting region having the same orientation (i.e., opening to the top T of the shaft 12 or the bottom B of the shaft).

Each L-shaped slot 30 includes a flat 31 machined into the body of the shaft and extending peripherally. The flats 31 are configured relative to the flat ends of the fingers 122, 124 to allow the fingers to slide over the flats 31 in a corresponding mounting region (i.e., the distance between two corresponding flats 31 is slightly less than, equal to, or slightly larger than the distance between the flat ends of fingers 122, 124 of a scroll module mounted in that mounting region). A mounting channel 33 intersects the flat 31 and extends axially from the flat 31 to form a ledge 35 for constraining an associated scroll module. Each mounting channel 33 mounts a leg 122 or 123 of a scroll module 100 or 102. Each L-shaped slot 30 is oriented based on the orientation and type of module to be mounted with that slot. The ledges 35 alternate between facing the top T of the shaft 12 and the bottom B of the shaft 12.

A first L-shaped slot in the first mounting region 22 near the first end 13 includes a locking groove 202 for locking a first locking collar 200 to the shaft. An L-shaped slot in the sixth mounting region 27 on an opposite end 14 of the shaft 12 from the L-shaped slot including the locking groove 202 includes a second locking groove 204 for locking a second locking collar to the shaft. The locking grooves 202, 204 are formed on opposite sides of the shaft 12.

Figure 14:
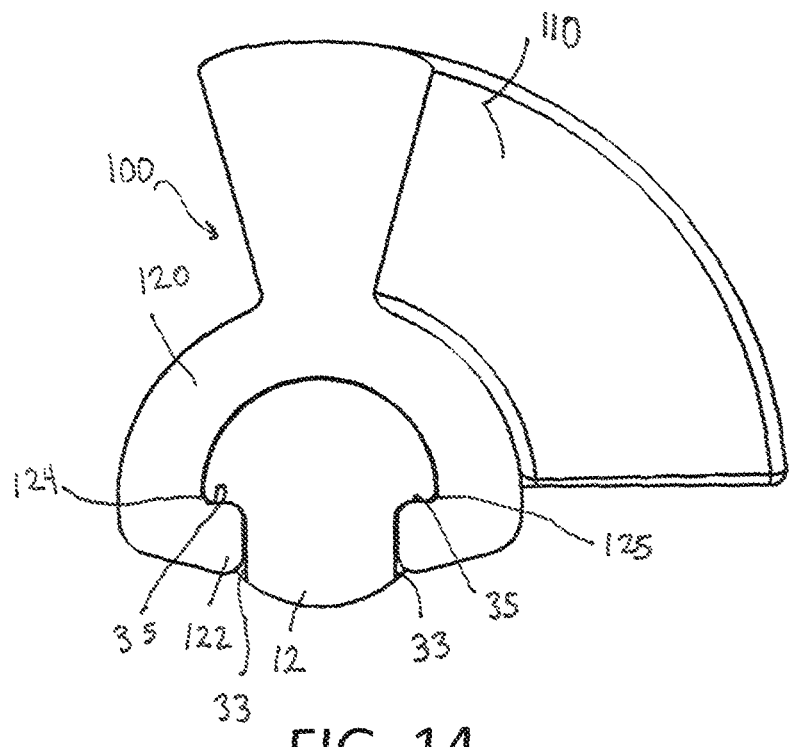
FIG. 14 is a front view of a scroll module mounted on the shaft of FIG. 10.

As shown in FIG. 14, when a scroll module 100 is mounted to the shaft 12, such that the open hub of the clamping portion 120 receives the main body of the shaft, the flat ends of the fingers 122, 124 are received in mounting channels 33, after sliding over the flats 31. The shaft ledges 35 are seated in the bends 124, 125 within the hub. In this manner, the scroll module 100 is fixed to the shaft and rotates with the shaft 12. The hub 120 may flex slightly to slide over the flats 31, or may freely slide over the flats 31 without flexing.

Figures 15A, 15B, 15C, 15D, 16A, 16B, 16C, 16D:
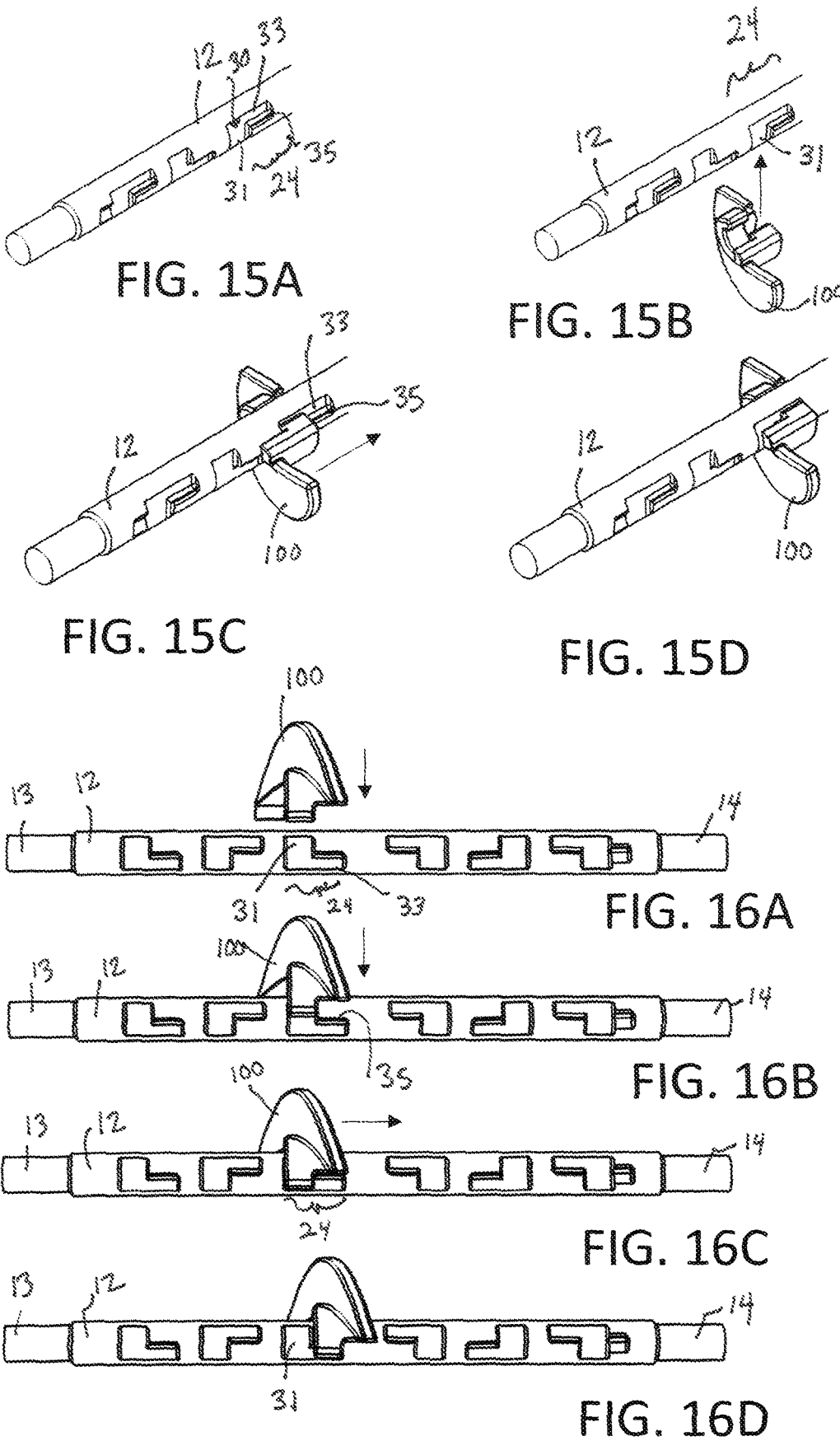
FIGS. 15A-15D are isometric views show the steps involved in mounting a first scroll module to the shaft during formation of the helical pulley assembly of FIG. 1.
FIGS. 16A-16D are side views show the steps involved in mounting a first scroll module to the shaft during formation of the helical pulley assembly of FIG. 1.

FIGS. 15A-15D and 16A-16D show the process for installing a first scroll module 100 on a shaft 12 to initiate mounting of the entire assembly 10. The illustrative left-hand modules 100 are installed from the inner portion of the shaft 12 to the first end 13, with a first scroll module 100 installed in a central mounting region 24. The right-hand modules 102 can be installed beginning with central mounting region 25 and continuing towards the second end 14. First, a first scroll module 100 is aligned with the associated mounting region 24, as shown in FIGS. 15B and 16A. Then, the first scroll module is moved in a first direction onto the shaft 12, with the flat ends of the fingers 122, 124 sliding over the flats 31 formed in the shaft 12 in the mounting region, as shown in FIGS. 15C and 16B. Then, the first scroll module 100 slides in a perpendicular direction towards the middle of the shaft 12, as shown in FIGS. 15C and 16C, to seat the shaft ledges 35 in the bends 124, 125 of the scroll module hub 120, as shown in FIGS. 15D and 16D.

Figures 17A, 17B:
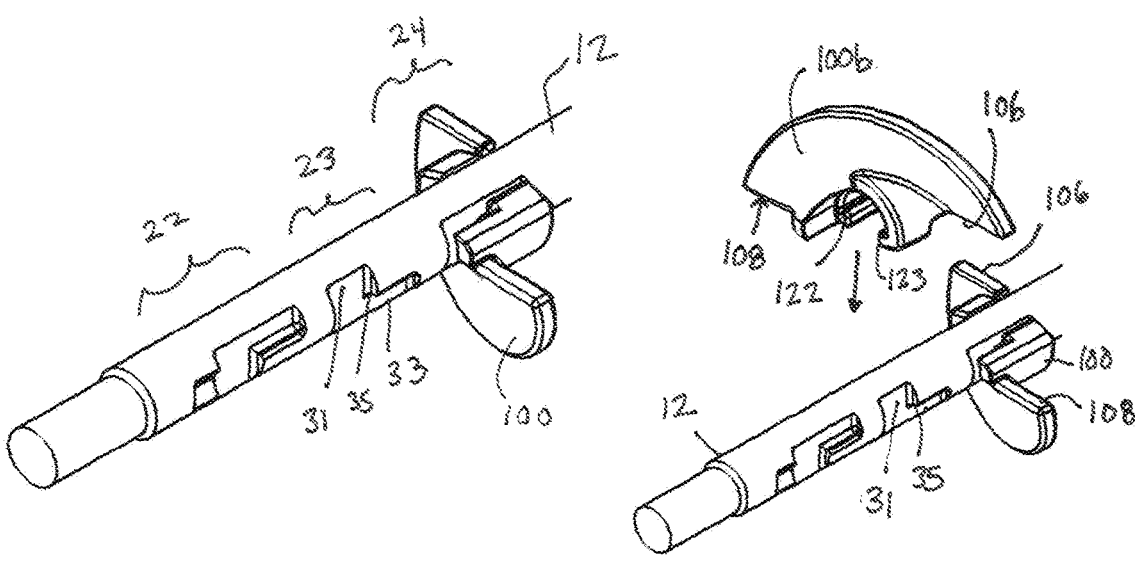
FIGS. 17A-17D show the steps involved in mounting a second scroll module to the shaft of FIGS. 15A-16D.
Figures 17C, 17D:
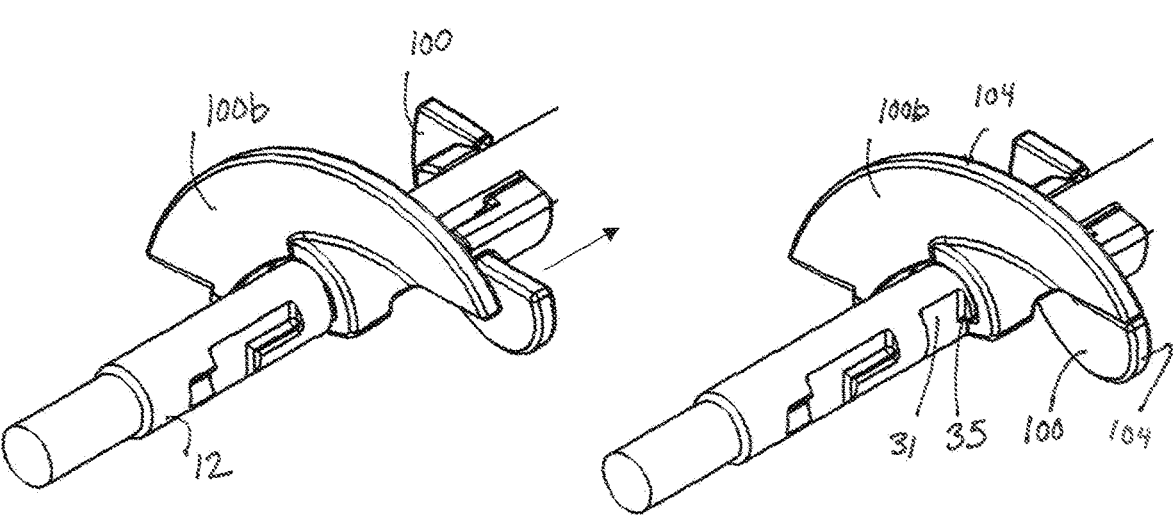

A subsequent scroll module 100b can be installed in series with the first scroll module 100, as shown in FIGS. 17A-17D in an adjacent mounting region 23. Similarly, the second scroll module 100b is slid in a first direction over the shaft body, so that the flat ends of the fingers 122, 123 slide over flats 31 in the mounting region, as shown in FIG. 17B. Then, as shown in FIG. 17C, the second scroll modules 100b slides in a second, perpendicular direction towards the first scroll module 100 so that the shaft ledges 35 are inserted into the bends 124, 125 of the scroll module hub to secure the second scroll module 100b relative to the first scroll module 100 and form a complete turn of a helix, as shown in FIG. 17D. When assembled, a first edge 106 of a second module abuts a second edge 108 of a first module, 108, as shown in FIG. 17D, to continue the helical shape of the peripheral surface 104.

Figure 18A:
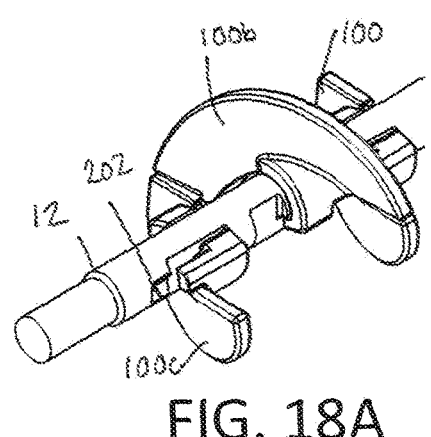
FIGS. 18A-18D show the steps involved in mounting a third scroll module and locking collar to complete a first half of the helical pulley assembly according to an embodiment.
Figure 18B:
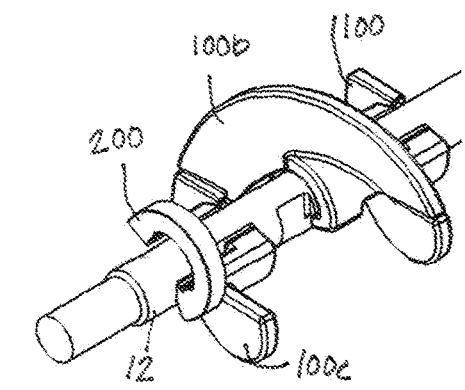
Figure 18C:
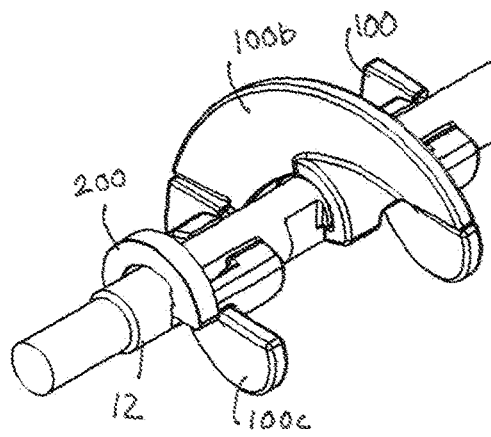
Figure 18D:
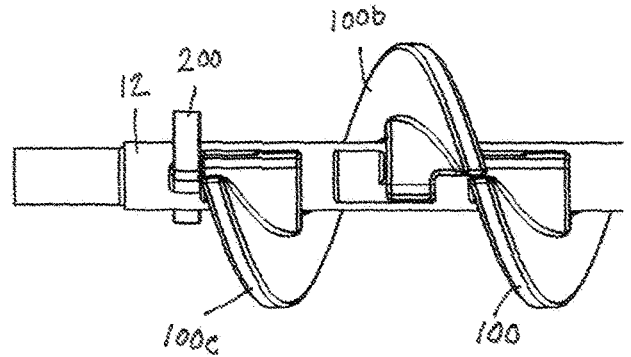
Figure 19:
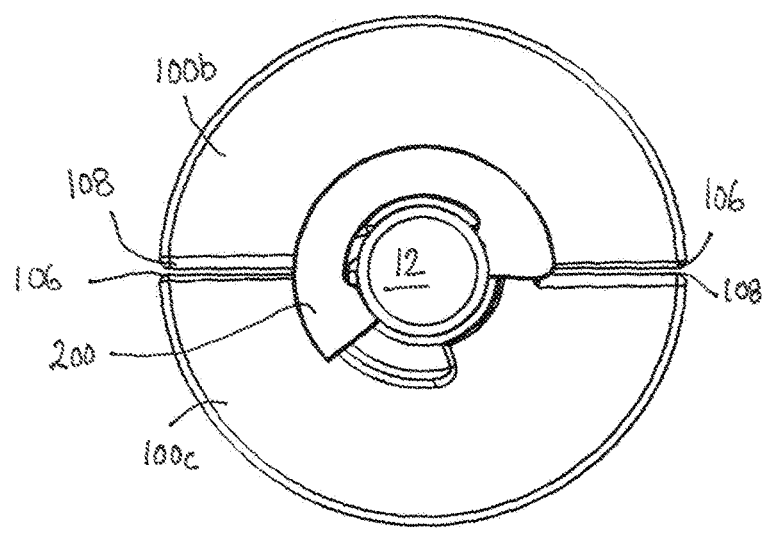
FIG. 19 is an end view of the assembly after completion of the steps in FIGS. 18A-18D.

After a third scroll module 100c (or the last scroll module in the series of left-handed scroll modules) is similarly installed in the outside mounting region 22, as shown in FIG. 18A, a locking collar 200 may be installed on the shaft to secure the series of scroll modules 100 relative to the shaft 12, as shown in FIGS. 18B-18D, 19 and 20. The locking groove 202 near the first end of the shaft 12 helps secure the locking collar 200.

The locking collar 200, shown in FIGS. 21-22, comprises an open hub having a curved outer surface 220 and a radially inner surface 222 forming a shaft-receiving opening 223. A first end 226 of the locking collar includes a flat end surface 224 and a curved inner surface 225 stepped inwards from the main radially inner surface 222. The second end 227 forms a radially-inwards extending tab 228 configured to be received in a locking groove 202 of the shaft 12.

To secure the locking collar 200 on the shaft 12, as shown in FIGS. 23A-23C, the locking collar 200 is oriented and brought near the shaft. The radially-inwards extending tab 228 is inserted in the locking groove 202. Then the locking collar 200 snaps onto the shaft to the locked orientation shown in FIG. 23C. The locking collar 200 elastically deforms as it snaps onto the shaft 23.

Figures 24, 25, 26, 27, 28, 29:
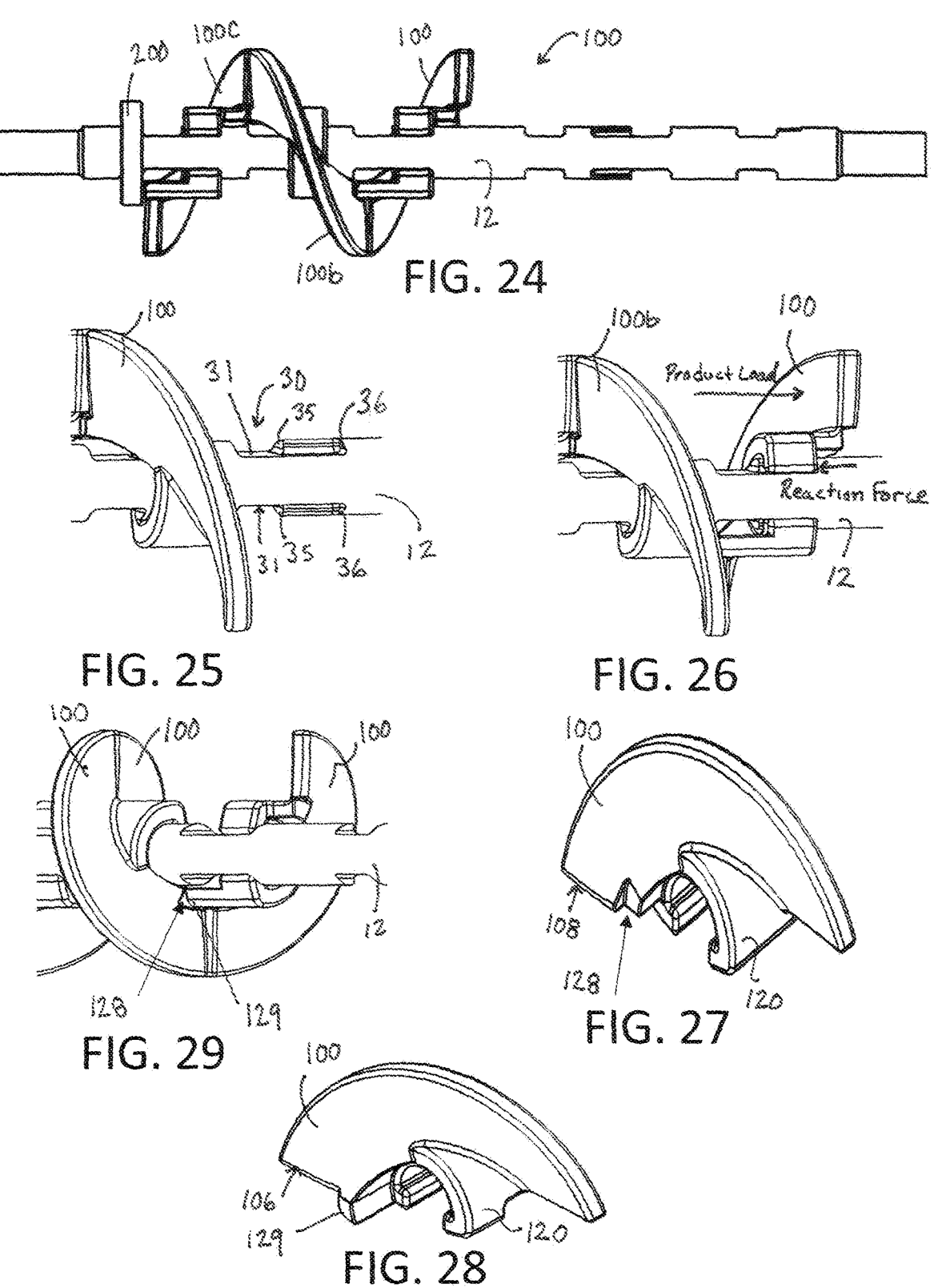
FIG. 24 is another view of a completed first side of the helical pulley assembly of FIG. 1.
FIG. 25 is a detailed view of an L-shaped slot for mounting a scroll module.
FIG. 26 shows the scroll module of FIG. 25 bottomed out against the L-shaped slot.
FIG. 27 is an isometric view of a first side of a scroll module detailing a cut-out.
FIG. 28 is an isometric view of a second side of the scroll module of FIG. 2 detailing a protruding face.
FIG. 29 shows the interface between the cut-out and protruding face of assembled scroll modules on a shaft according to an embodiment.

FIG. 24 shows the one side of the scroll assembly 10 after insertion of the left-handed scroll modules 100, 100b, 100c, and locking collar 200, in order. The range of motion of the first and second scroll modules 100, 100b are limited axially by the subsequently installed third scroll module 100c, as well as the interference between the module hub and the associated mounting channel 33 on the shaft. The third scroll module 100c is limited axially by the locking collar 200 and the associated mounting channel 33 on the shaft. The second side of the scroll assembly 10, comprising the right-handed modules 102 and second locking collar 200 can be mounted in a similar serial manner.

FIG. 25 shows in detail the bottom wall 36 of the mounting channel 33 in an L-shaped mounting slot 30 that axially limits the movement of an associate scroll module 100.

As shown in FIG. 26, the scroll module 100 bottoms out against the bottom wall 36 as product load is applied to the scroll assembly while rotating.

As shown in FIG. 27, a scroll module 100 can include a cut out 128 between the second edge 108 and hub 120. As shown in FIG. 28, a protruding face 129 is formed diagonally opposite the cut out 128 between the first edge 106 and hub 120 and extending below the first edge 106. The cut out 128 provides a flat surface for the protruding face 129 of an adjacent scroll module to bottom out against, preventing the modules from sliding and falling off the shaft 12, as shown in FIG. 29.

Figure 30:
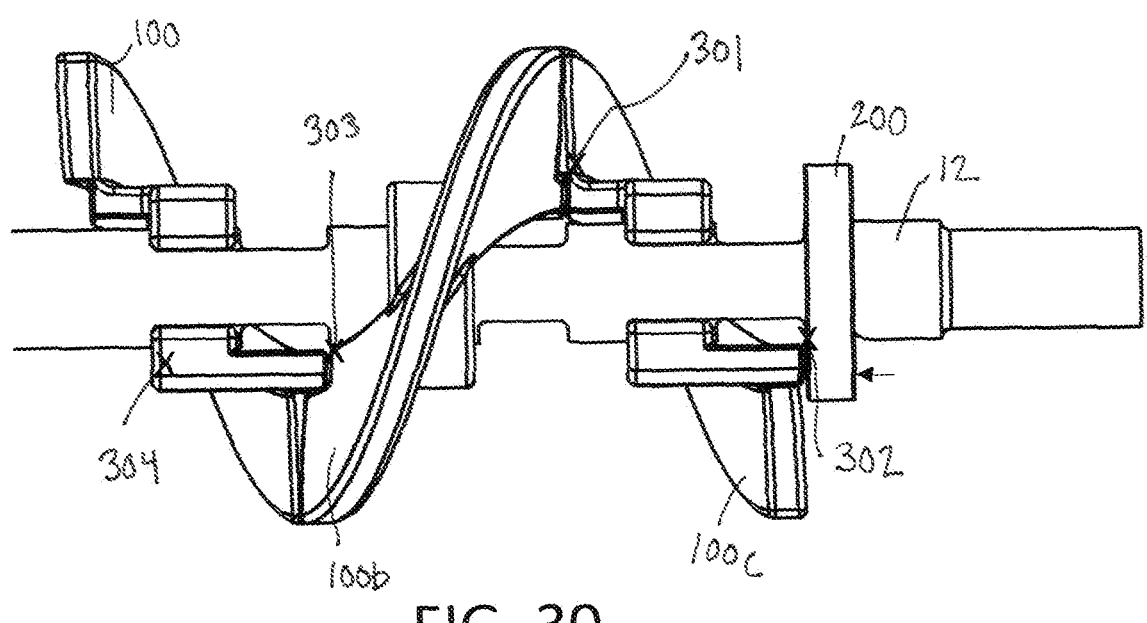
FIG. 30 is a front view of the first side of the helical pulley assembly of FIG. 24 detailing the points of contact between the components.

FIG. 30 shows the points of contact 301, 302, 303, 304 between the scroll modules 100, 100b, 100c and locking collar 200 mounted on the shaft 12 to form an assembly. When the locking collar 200 is installed, the scroll modules 100, 100b, 100c are unable to slide off of the shaft due to interference with subsequently installed modules and the locking collar 200. The locking collar 200 is located at the ends of the shaft 12 for easy access to install and uninstall the scroll modules 100.

Figure 31:
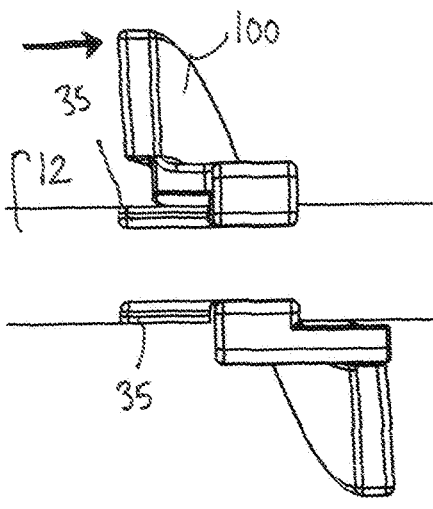
FIG. 31 is a bottom view of a scroll module during disassembly of the helical pulley assembly of FIG. 1.

As shown in FIG. 31, a scroll module 100 can be uninstalled from the shaft 12 (provided no other interferences) by sliding the module away from the ledges 35 into the flats 31 and pulling the scroll module 100 away from the shaft. The modules 100 can be removed in reverse order of installation.

Although the invention has been described with reference to a few versions, other versions are possible. The scope of the invention is not meant to be limited to the details of the various exemplary versions.

What is claimed is:

1. A scroll module for a conveyor, comprising:
   a clamp portion having an open hub forming a shaft-receiving opening for seating a shaft of the conveyor;
   a webbed scroll portion extending from the clamp portion having a body that arcs and twists from a first edge to a second edge to form a half-coil of a helix, wherein the first edge is straight and extends radially from the clamp portion perpendicular to the axis of the shaft-receiving opening and the second edge is straight and extends from the clamp portion perpendicular to the axis of the shaft-receiving opening;
   a cut out between the second edge and the open hub; and
   a protruding face formed diagonally opposite the cut out between the first edge and the open hub and extending below the first edge.

2. The scroll module of claim 1, wherein the open hub includes opposing fingers at each end for narrowing the shaft-receiving opening.

3. The scroll module of claim 2, wherein the opposing fingers terminate in flat ends.

4. An assembly for a conveyor comprising:
   a shaft having a plurality of L-shaped mounting slots formed in a series of mounting regions;
   a series of scroll modules mounted to the shaft using the L-shaped mounting slots to form a helical pulley; and
   a locking collar for limiting axial movement of the series of scroll modules along the shaft.

5. The assembly of claim 4, wherein a first L-shaped mounting slot near a first end of the shaft includes a locking groove for locking the locking collar onto the shaft.

6. The assembly of claim 4, wherein a second L-shaped mounting slot near a second end of the shaft includes a locking groove for locking a second locking collar onto the shaft.

7. The assembly of claim 4, wherein the series of scroll modules comprises a set of first scroll modules, with webbed scroll portions that extend in a first helical direction, arranged in series and a set of second scroll modules, with webbed scroll portions that extend in an opposite helical direction.

8. The assembly of claim 4, wherein each scroll module comprises:
   a clamp portion having an open hub forming a shaft-receiving opening for seating the shaft; and
   a webbed scroll portion extending from the clamp portion having a body that arcs and twists from a first edge to a second edge to form a half-coil of a helix.

9. The assembly of claim 8, wherein each open hub includes opposing fingers at each end for narrowing the shaft-receiving opening, each finger received in an axial leg of an associated L-shaped mounting slot.

10. The assembly of claim 8, wherein each first edge is straight and extends radially from the associated clamp portion perpendicular to the axis of the shaft-receiving opening.

11. The assembly of claim 10, wherein each second edge is straight and extends radially from the associated clamp portion perpendicular to the axis of the shaft-receiving opening.

12. The assembly of claim 11, wherein the second edge of a first scroll module is adjacent to the first edge of a second scroll module.

13. The assembly of claim 4, wherein each mounting region includes an L-shaped mounting slot on each side of the shaft.

14. The assembly of claim 4, wherein each L-shaped mounting slot includes a peripherally-extending flat and an axially-extending mounting channel intersecting the flat to form a ledge.

15. A method of assembling a scroll assembly on a shaft in a conveyor, the shaft comprising a plurality of mounting regions, each mounting region including an L-shaped mounting slot on each side of the shaft, the method comprising the steps of:

installing a first scroll module on the shaft in a first mounting region by sliding fingers in a hub portion of the first scroll module over peripheral flats in a first pair of L-shaped mounting slots and then moving the first scroll module in an axial direction to seat ledges in the first pair of L-shaped mounting slots in bends in the hub portion; and installing a second scroll module on the shaft, by sliding fingers in a hub portion of the second scroll module over peripheral flats in a second pair of L-shaped mounting slots, and then moving the second scroll module in the axial direction to seat ledges in the second pair of L-shaped mounting slots in bends in the hub portion, wherein the first scroll module and second scroll module together form a complete turn of a helix.

16. The method of claim 15, further comprising the step of installing a third scroll module adjacent the second scroll module.

17. The method of claim 16, further comprising the step of installing a locking collar on the shaft to secure the scroll modules.

18. The method of claim 17, further comprising the step of installing a series of scroll modules having a different orientation from the first, second and third scroll modules on the shaft.

\* \* \* \* \*